US005628013A

United States Patent [19]
Anderson et al.

[11] Patent Number: 5,628,013
[45] Date of Patent: May 6, 1997

[54] APPARATUS AND METHOD FOR ALLOCATING PROCESSING TIME IN A FRAME-BASED COMPUTER SYSTEM

[75] Inventors: Eric C. Anderson, San Jose; A. Phillip Sohn, Campbell, both of Calif.; Hugh B. Svendsen, Atlanta, Ga.

[73] Assignee: Apple Computer, Inc., Cupertino, Calif.

[21] Appl. No.: 954,338

[22] Filed: Sep. 30, 1992

[51] Int. Cl.⁶ .................................................. G06F 9/44
[52] U.S. Cl. .................................................. 395/677
[58] Field of Search .................................. 395/550, 650; 364/280, 281.3, 281.7, 281.8

[56] References Cited

U.S. PATENT DOCUMENTS 5,371,887  12/1994  Yoshida et al. ......................... 395/650

FOREIGN PATENT DOCUMENTS 473444A   3/1992   European Pat. Off. .
482815A   4/1992   European Pat. Off. .

OTHER PUBLICATIONS

ICASSP-92, D2EV, vol. 5, San Francisco, CA, US, pp. 549–552, I. Kuroda, et al. "Asynchronous Multirate System Design For Programmable DSPs".

Microprocessing and Microprogramming, vol. 28, No. 1/5, Mars 1990, Amsterdam, NL, pp. 211–216, R. Cobelli, et al. "Real Time Scheduling Algorithms and Their Performances".

Search Report, INPI, No 9311210000, Nov. 10, 1995.

Calingaert; *Operating System Elements*; Prentice-Hall, 1982.

Alijani, et al.; "A task scheduling Scheme for Real–Time Multi-Robotics Systems"; Euromicro Workshop on Real Time, 1991.

*Primary Examiner*—Thomas M. Heckler
*Attorney, Agent, or Firm*—Blakely, Sokoloff, Taylor & Zafman

[57] ABSTRACT

In a computer system having a digital signal processor for processing tasks in real-time within a series of frames, a method is described for determining whether there is enough processing time available within each frame to process the task such that the frame's total processing time is not exceeded. First, the task's processing time requirement is determined. The time for executing the current task list is then calculated. Next, the remaining amount of processing time available in the frame is determined. This is accomplished by subtracting the current task list execution time from the frame's total processing time. The new task is installed in the task list if the frame's available processing time is at least as great as the task's required processing time. Otherwise, the task is not installed in the task list and an error indication is generated.

36 Claims, 6 Drawing Sheets

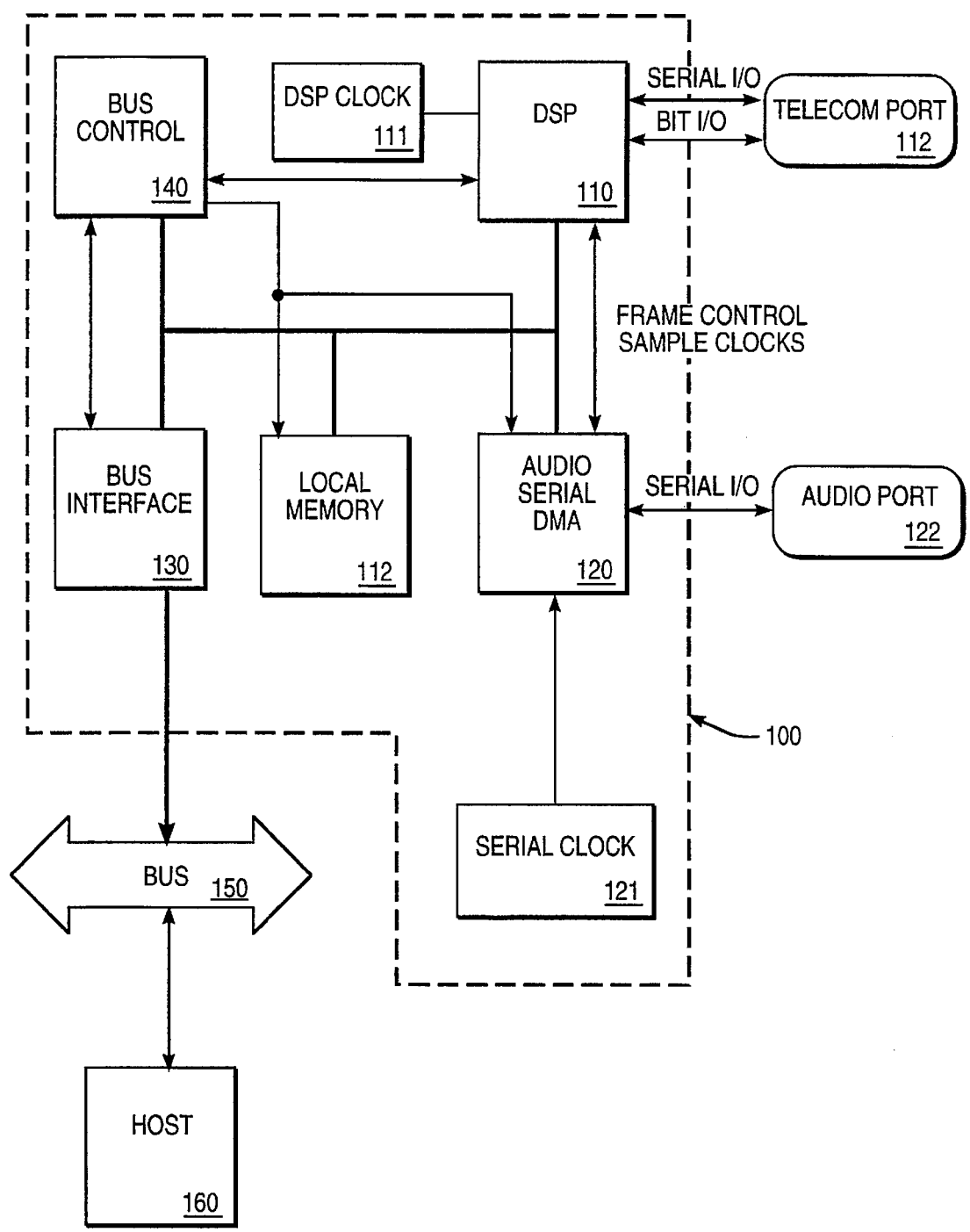
FIG_1

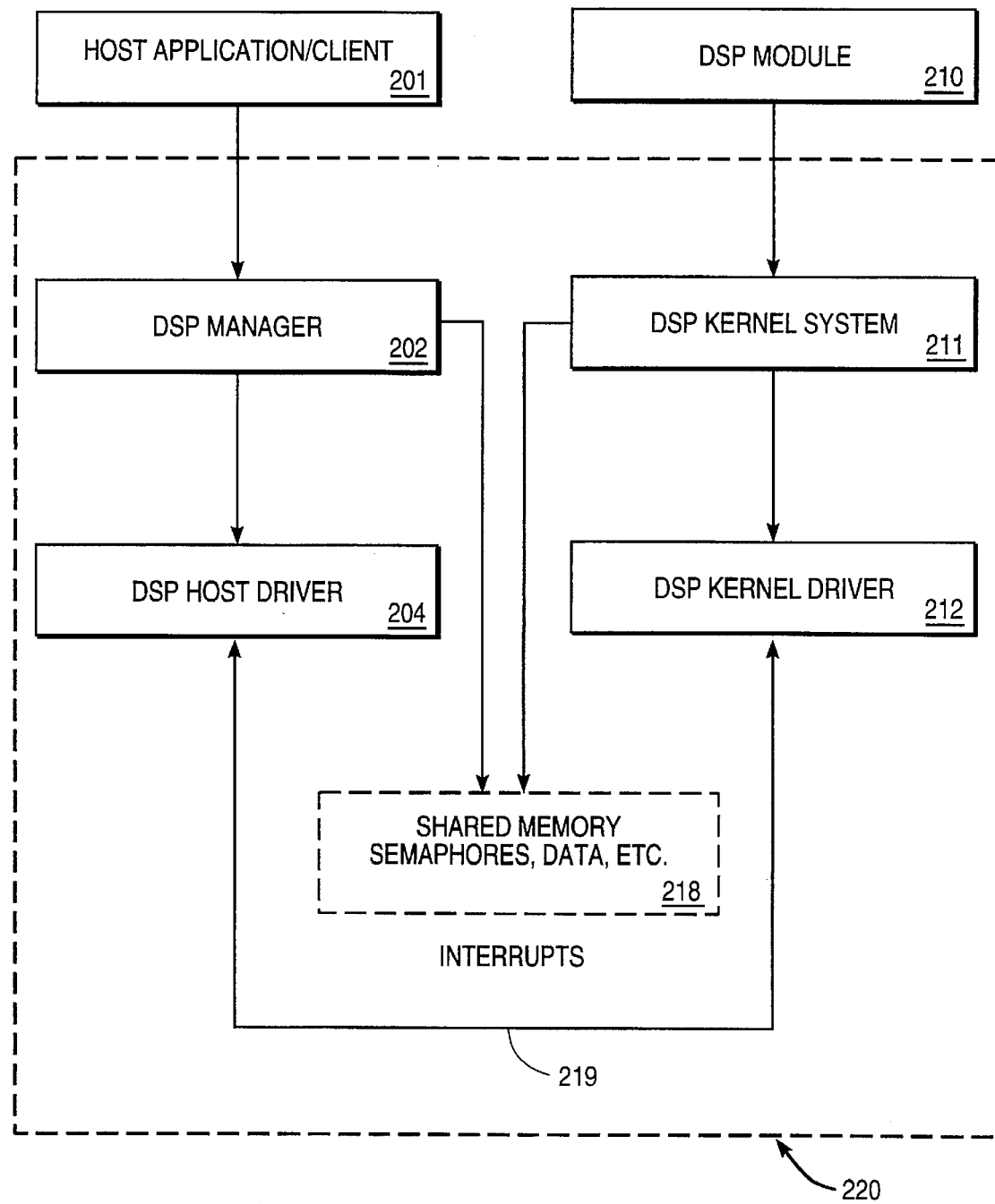
FIG_2

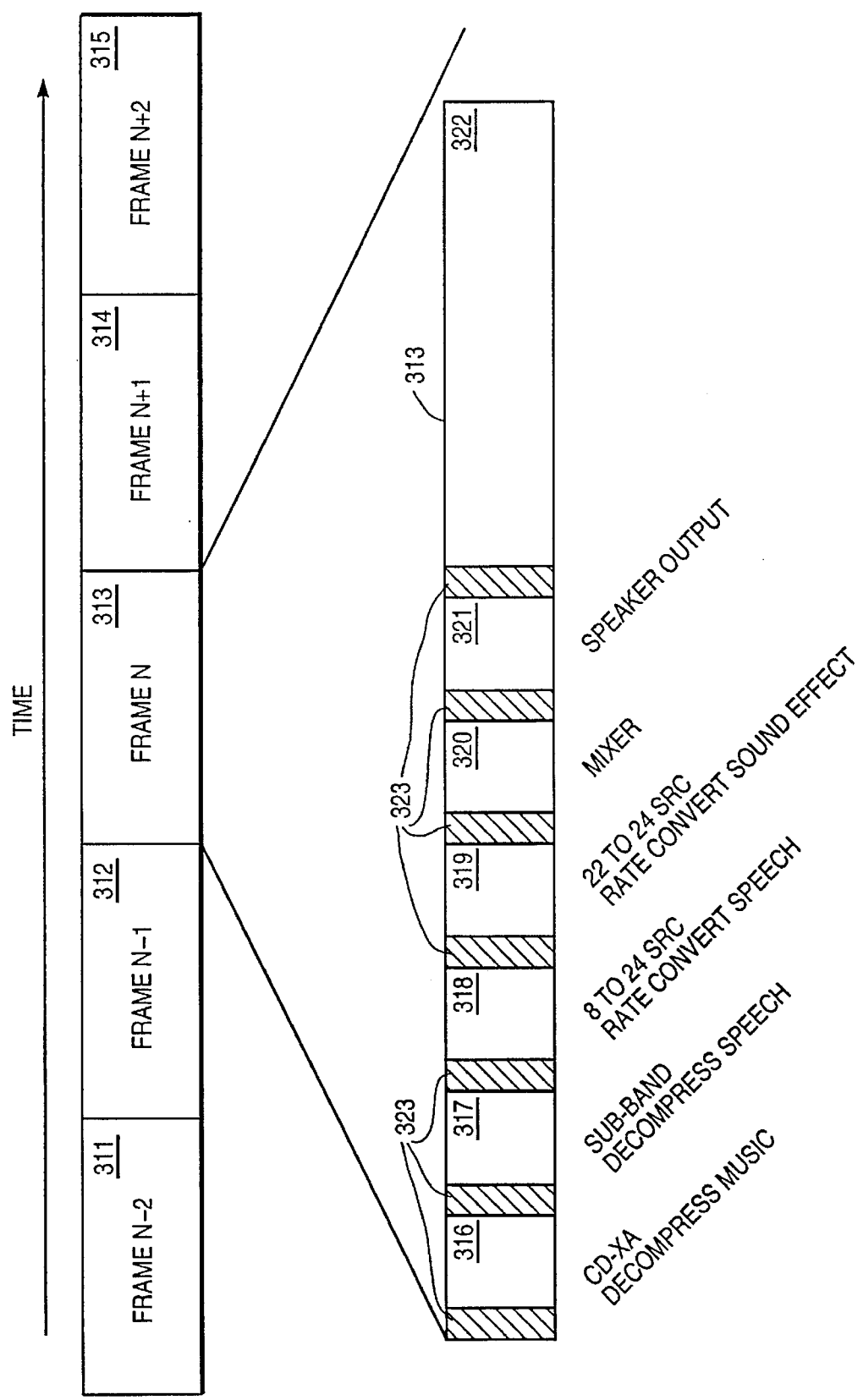
FIG_3

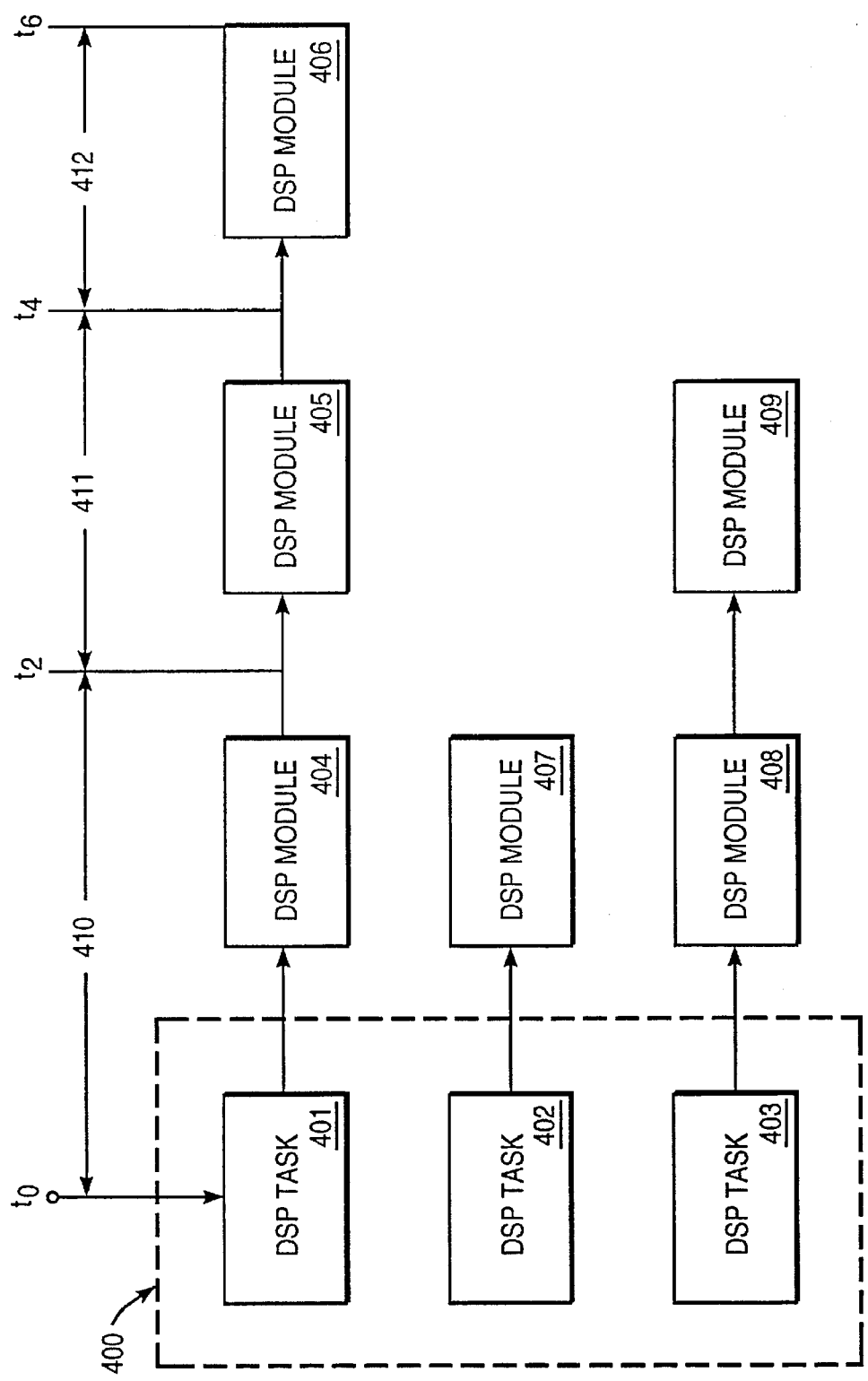

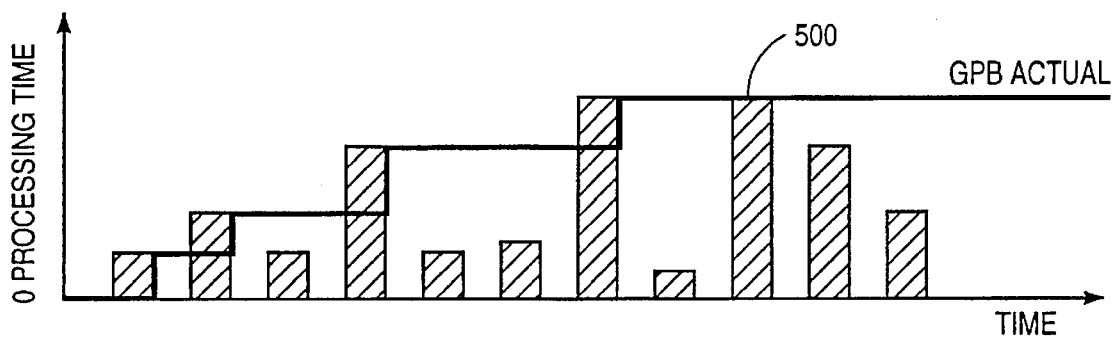
FIG_5
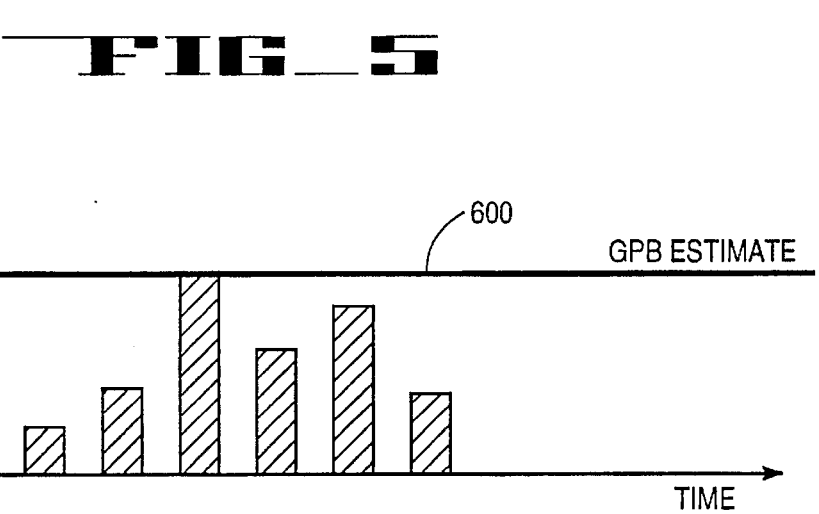
FIG_6
FIG_7

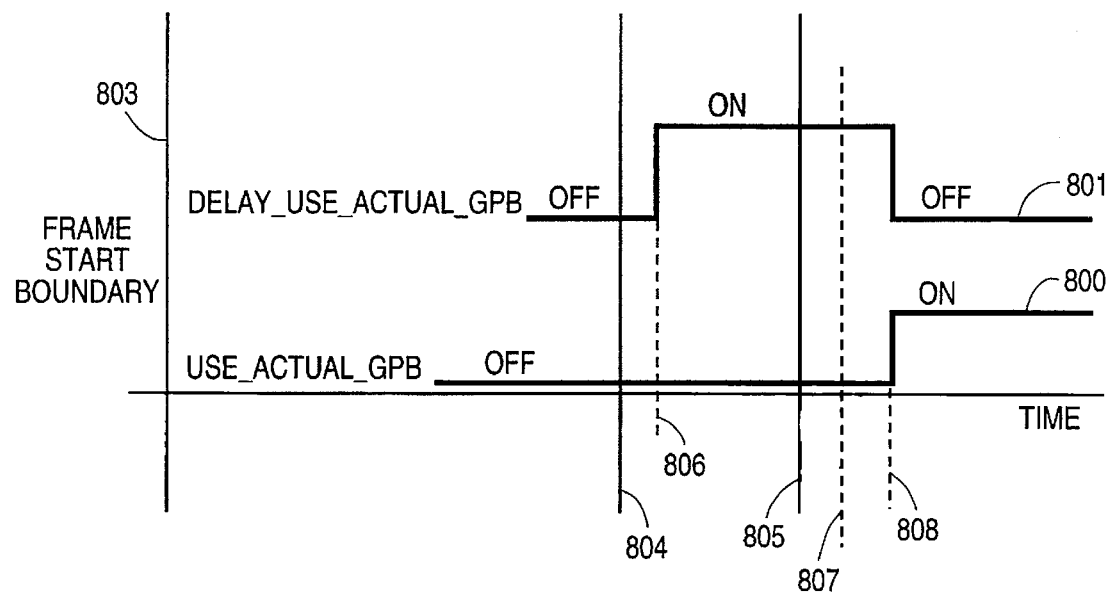
FIG_8
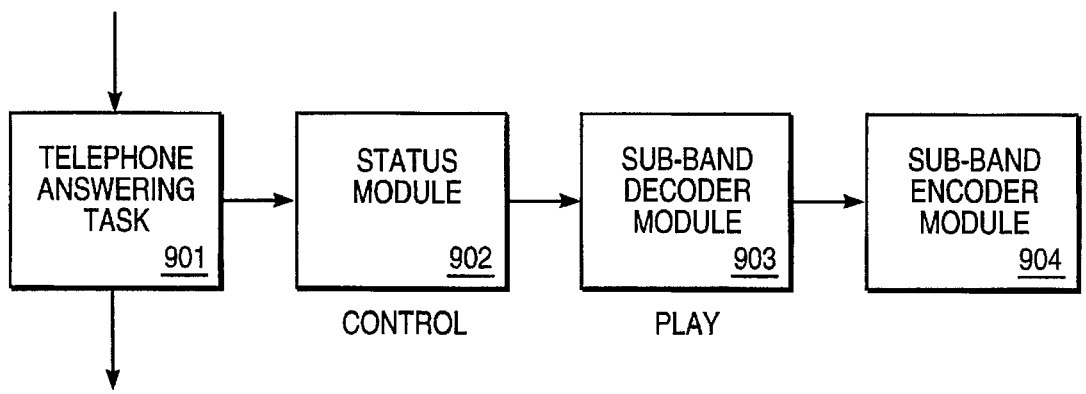
FIG_9

APPARATUS AND METHOD FOR ALLOCATING PROCESSING TIME IN A FRAME-BASED COMPUTER SYSTEM

FIELD OF THE INVENTION

The present invention pertains to the field of real-time processing in frame-based processing computer systems. More particularly, the present invention relates to an apparatus and method for measuring and controlling execution time in a frame-based computer system so that real-time tasks from different applications can be dynamically scheduled without conflicts on the processing system.

BACKGROUND OF THE INVENTION

Time correlated data such as sounds, images, speech, etc. are by their nature analog (i.e. continuous). However, computers are, for the most part, digital (i.e. discrete). In order for a digital computer to process analog signals, the analog signals are first converted into digital signals which represent the analog signals. This is accomplished by repeatedly sampling the analog signals in short time intervals and converting each sampled value into a digital value. The resulting digital signal can then be processed by the digital computer. The processing of such digitized signals by a computer is known as digital signal processing.

Presently, digital signal processing is being applied to multimedia applications whereby text, audio, speech, video, data communications, and other time correlated data are integrated to create a more effective presentation of information. However, handling these applications in a real-time environment requires a large amount of processing power. The computer's Central Processing Unit (CPU) typically does not have the requisite processing power. In order to handle the load associated with operating these tasks in real-time, one or more dedicated digital signal processors (DSPs) are employed.

A DSP is designed to accept incoming samples at the average rate that the samples are being generated by an input process. The DSP then processes the input samples according to a computer program and produces outgoing signals at the average consumption rate of an output process. One efficient method for performing real-time processing on a DSP is known as frame-based processing. In frame-based processing, time is divided into a series of discrete units known as "frames," within which all the required signal processing for that frame is completed.

This is accomplished by dividing digital signals into groups which represent the same amount of time as a frame. For example, given that Compact Disc audio data runs at a rate of 44,100 samples per second and assuming a frame rate of 10 milliseconds (100 frames per second), there would be 441 samples per frame. During each frame, the corresponding program code, variables, and input samples are loaded into a high speed cache. From the cache, the input samples are then processed according to the tasks. Finally, the resulting output data is dumped into an output buffer to be used by an output process.

In a frame-based architecture, each of the tasks is typically linked or associated with one another through a data structure. An interrupt or other timing signal is generated and sent to the DSP at the beginning of each frame. This initiates the processing of the data structure, such that each task is sequentially executed within a frame.

One of the advantages of frame-based processing is that it reduces the task switching overhead. For example, given four tasks each handling a sample stream of 44,100 samples per second, if each task must be run once for every sample, you have a total of 4*44,100 or 176400 task switches in a second. By implementing frame-based processing running 100 frames per second and given the same four tasks, each of which run 100 times in a second, requires only 400 task switches per second. This reduces the task switching overhead by a factor of 441.

One major drawback with a frame-based system is increased latency. A processing system that handles one sample at a time can respond in the next sample to a change in the input. In a frame-based system, a response takes two frames. This is because data is collected in one frame, processed in the next frame, and output in the following frame.

Another problem with frame-based systems is that, because each individual frame is of a fixed time duration, there exists only a certain, finite amount of processing time per frame. Consequently, when a number of tasks are being processed in real-time, it must be ensured that the frame's processing time is not exceeded. Otherwise, the real-time process will be disrupted in an unacceptable manner. Under certain circumstances, a frame's processing might be exceeded when executing the tasks to be processed during that frame. For instance, an unexpected aspect of one of the task's algorithms might cause that task to require more processing time, resulting in a frame overrun. Another example which might lead to a frame overrun is if a task is sensitive to input data, and the data has been corrupted or damaged. Indeed, an overloaded bus might deteriorate the system performance to a point whereby a frame overrun occurs. In some cases, such as debugging a program on a line-by-line basis, frame overruns are inevitable. Sometimes a task's algorithm might operate properly 99.9% of the time, but due to a defect, a particular command or data sequence results in an endless loop or an inordinate increase in processing time.

Ensuring that 100 percent of the frame's processing is not exceeded is relatively easy to implement if there is only one application running a single task. When the application is being written, the programmer can account for particular tasks and adjust the processing accordingly. In contrast, if a variety of multiple tasks are being installed and run by a number of different applications, a serious problem arises in determining whether there is enough processing power left in a particular frame for handling subsequent applications and/or tasks processing requests. Different hardware substantiations or configurations may also affect the processing load.

Thus, what is needed is an apparatus and method for determining 1) the processing time available within a frame when an additional task is about to be installed and 2) the worst-case processing time for that task. These two values can be compared to guarantee that when a task is installed, it can be fully executed within that frame. It would also be beneficial for the apparatus and method to be simple to implement, have low overhead, and also be dynamic (i.e., adaptive in real-time to the real environment).

SUMMARY AND OBJECTS OF THE INVENTION

In view of the problems associated with frame-based processing, one object of the present invention is to provide an apparatus and method for allocating a frame's processing time so that the time required to process real-time tasks associated with that frame does not exceed that frame's total processing time.

Another object of the present invention is to calculate the worst-case processing time for a group of modules for a task rather than simply adding together the processing times for the individual modules.

Another object of the present invention is to provide scaling vectors so that a piece of code can operate over various instantiations.

Another object of the present invention is to implement a frame-based allocation apparatus and method which is dynamic (i.e., adaptive in real-time to the real environment).

The currently preferred embodiment of the present invention also includes a second task list, called the timeshare task list. This task list is executed in any excess time within each frame that is not required to execute the real-time task list. This is referred to as timeshare processing. Another object of the present invention is to determine whether an application can be properly serviced on a timeshare basis.

These and other objects of the present invention are implemented in a frame based computer system which utilizes a digital signal processor for processing a plurality of tasks in a real-time environment. When an application requests that a particular task be processed in real-time, the present invention determines whether there is enough processing time available within each frame to process the task such that the frame's total processing time is not overrun. This is accomplished by first determining the task's processing time. A task is constructed of one or more processing modules. The task's processing time is calculated by adding together the time it takes to process the modules for a worst-case utilization situation. A modules' processing time is either an actually measured processing time (as measured by a timer) or an estimated processing time. Whether the actual or estimated value is used depends on the type of algorithm used in the module and the current status of the module. The present invention categorizes algorithms into three different types: smooth, smart-lumpy, and dumb-lumpy.

Next, the real-time task list's processing time is determined. The task list includes the tasks which have already been installed and will be executed within the frame. The task list's processing time is determined by adding together all the processing times of the installed tasks. The amount of processing time available is calculated by subtracting the task list processing time from the frame's total available processing for realtime. The additional task is installed in the task list if the frame's available processing time is sufficient to handle the additional task's processing requirement. Otherwise, a signal is generated to indicate that the task cannot be installed.

In addition, the present invention enhances the modularization of digital signal processing functions for various configurations by implementing scaling vectors. The scaling vectors enable one module to function in multiple instantiations. Furthermore, scaling vectors allow for a module's processing time to be dynamically varied, depending on the availability of the frame's processing time.

The present invention can also be used to aid in the determination of whether a particular task is serviceable on a timeshare basis.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a computer system as may be utilized by the preferred embodiment of the present invention.

FIG. 2 illustrates a software system architecture as may be utilized by the preferred embodiment of the present invention.

FIG. 3 illustrates a sequence of frames including the processing of a Sound Player task in one of the frames.

FIG. 4 illustrates a programming structure having tasks in a task list and modules associated with each task.

FIG. 5 is a chart of the GPB Actual value for a particular module.

FIG. 6 is a chart illustrating the GPB Estimate value for a particular module.

FIG. 7 illustrates a smooth algorithm.

FIG. 8 illustrates the states of the UseActualGPB flag and the DelayUseActualGPB flag in reference to the processing of a smart-lumpy module.

FIG. 9 illustrates a Telephone Answering task comprised of grouped modules.

DETAILED DESCRIPTION

A method and apparatus for handling the allocation of real-time resources that is dynamic (i.e. adaptive to real-time in a real environment) is described. In the following description, for the purposes of explanation, numerous specific details such as register and buffer sizes, frequencies, frame lengths, timer values, sample rates, scaling vectors, GPB values, etc. are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of a Computer System in the Preferred Embodiment

Referring to FIG. 1, the processing system upon which the preferred embodiment of the present invention may be practiced is shown as 100. Apparatus 100 comprises a processing unit 110 which is, in this embodiment, a digital signal processor (DSP). For instance, 110 may be a DSP3210 Digital® Signal Processor, available from American Telephone and Telegraph (AT&T) Microelectronics of Allentown, Penn. DSP 110 is driven by a DSP clock 111 which provides a timing reference.

Processing system 110 is also coupled to an audio serial DMA (direct memory access) circuit 120 which facilitates transfers between a local memory 112 and/or information transferred on bus 150. In some embodiments, there is no local memory 112, so DMA circuit 120 may allow DMA transfers on bus 150. This may include information transferred via bus 150 from a host processor circuitry 160, and/or host processor memory (not shown). In addition, audio serial DMA circuit 120 provides output to an audio port such as 122 in a serial fashion as driven by a serial clock 121. DSP 110 is also coupled to a telecom port 112 for transmission of serial and bit input/output information, such as fax and/or computer data information transmitted over telephone lines.

Processing system 100 further comprises a bus control unit 140 which is coupled to DSP 110 and a bus interlace circuit 130 which facilitates communication between apparatus 100 and bus 150. Bus 150 may be either the computer bus in which apparatus 100 is installed, or may be a host bus coupled to a host processor 160. Bus 150 may be coupled to other devices such as input/output units, memory, peripheral interfaces (not shown) for providing various capabilities within the system.

Processing system 100 shown in FIG. 1 may be implemented as circuitry residing on a motherboard (main circuitry board) of a computer system or, in another embodiment, it may be implemented as an expansion card inserted into a slot in a computer system and thus communicate with host processor 160 over a communication bus 150. In one embodiment, host 160, bus 150, and processing system 100 may be one of the Macintosh® family of personal computers such as the Macintosh® II or Macintosh® Quadras manufactured by Apple Computer, Inc. of Cupertino, Calif. (Apple and Macintosh® are registered trademarks of Apple Computer, Inc.). Host 160 may comprise one of the 68000 families of microprocessors, such as the 68020, 68030, or 68040 manufactured by Motorola, Inc. of Schaumburg, Ill.

It should be noted that the structure of processing system 100 is shown as one embodiment and is not necessary for practicing the present invention. It should also be noted that in another embodiment, a plurality of additional DSPs may be coupled to a bus 150 such that a multiprocessing environment may be employed to provide enhanced capabilities. It will be appreciated by one skilled in the art that many departures and modifications of the circuitry shown in FIG. 1 may be employed to practice the present invention.

Overview of the Software Architecture

The operating software for the preferred embodiment works on a team processing basis. In particular, careful attention is paid to the division of labor between the host processor and the DSP. The overall system architecture is illustrated in FIG. 2. A host application or client 201 interfaces with a DSP Manager 202. The host application or client 201 represents either a specific application program or a higher level toolbox that is being accessed by a host application. The term client is commonly used to describe a relationship between a resource and a resource requestor. In this case, the resource being requested is the DSP processor. A toolbox refers to a predefined set of callable routines that carry out commonly used functions. Typically, such toolboxes are associated with a particular function (e.g. generating a graphical output). The host application may make use of the DSP functionality either directly by accessing the DSP Manager or through a higher level toolbox.

The DSP Manager 202 provides the host functionality through which host DSP applications are developed and controlled. The DSP Manager 202 further interfaces with a DSP Host Driver 204. The DSP Host Driver 204 executes on the host processor and provides specific hardware dependent functionality required to interface with a particular DSP processor and hardware implementation. The DSP Manager 202 further interfaces with a Shared Memory 218. The Shared Memory 218 may be defined in either or both local memory or main memory. Main memory is the system DRAM. Local memory may reside on a plug-in card, or on the main logic board, or may be defined as a portion of main memory. It is through this Shared Memory 218 that the DSP Manager 202 and the DSP Kernel 211 communicate.

In regards to the DSP processor, a DSP module 210 interfaces to the DSP Kernel 211. DSP module 210 represents a particular function or program that has been written for the DSP processor. The DSP Kernel resides in a storage location directly accessible by the DSP processor. The DSP Kernel 211 interfaces to a DSP Kernel Driver 212 and Shared Memory 218. The DSP Kernel Driver 212 contains hardware dependant routines and resides in local or system memory directly accessible by the DSP processor. The DSP Kernel Driver 212 communicates to the DSP Host Driver 204 via the Shared Memory 218 and through direct interrupts 219. The combination of the DSP Manager 202, DSP Host Driver 204, Shared Memory 218, DSP Kernel 211, and DSP Kernel Driver 212, comprises the DSP Operating System 220.

Programming Structures

The programming environment of the currently preferred embodiment of the present invention is comprised of three basic structures: sections, modules, and tasks. The basic structure for a DSP application is the section. A section contains information concerning the DSP executable code, data, variables, and input/output buffers. A number of sections are grouped together to form a module. Modules are provided to the host programmer as a resource and are loaded into a DSP task structure by using the DSP Manager. A module contains information for linking modules together and for controlling the execution of the module, thereby enabling the DSP Manager and the DSP Kernel to perform their functions.

Certain modules are grouped together to form tasks. Frequently, a DSP task will contain only one DSP module. The reason for forming a task is to place together in an appropriate order and with appropriate I/O buffer connections, all of the basic module functions required to perform a particular job. A further reason is to insure that the combined functions execute as a set, thereby providing consistent execution results. Tasks and their respective modules are started and stopped as a unit, installed and removed from the task list as a unit, and are built and connected to data streams as a single unit. A task is constructed by the host application programmer, using a series of calls to the DSP Manager. These calls create the task structure, load and connect modules in the desired arrangement, allocate the required memory, and install the completed task onto the DSP task list.

Guaranteed Processing Bandwidth

FIG. 3 illustrates an example of time being sliced into a series of frames 311–315. Frame 313 is the current frame; frames 311 and 312 are previous frames which have already been executed; and frames 314 and 315 are future frames which will be executed following the execution of frame 313. FIG. 3 also includes an example of a Sound Player task consisting of modules 316–321. Frame 313 has been enlarged to provide a more detailed view of the execution of the Sound Player task. The Sound Player task's modules 316–321 processes and mixes three channels of sound (e.g. music, speech, and sound effects) by switching between five different modules 316–321 to sequentially process blocks of data through different algorithms. A CD-XA decompressor 316 is used to decompress compressed music or compressed speech. Next, a sub-band decoder 317 and an 8 to 24 kHz sample rate converter 318 are used to process speech that was compressed with telephone quality for a higher compression factor, and then up-convert to the system transport rate. A 22.2545 to 24 kHz sample rate converter is implemented for processing sound effects recorded at a rate different than the 24 kHz system rate. A 24 kHz audio mixer 320 is implemented to mix the three sound channels. Finally, the sound is output to the speaker FIFO in 321. Before and after each module execution, caching operations 323 with context switching are performed.

It can be seen that the Sound Player task 316–321 uses approximately half of frame 313. Other tasks could be run in the time remaining 322 in frame 313. However, it must first be determined whether each additional task can be completely executed within frame 313. Hence, whenever a client requests that a task be installed, the operating system needs to determine whether there is enough time available to process that additional task within the subsequent frames. The present invention accomplishes this by implementing a Guaranteed Processing Bandwidth (GPB) system.

The GPB system is comprised of a set of two registers and three flags associated with each module. These registers and flags pertain to and are stored with each module. The two registers are the GPB Actual Register, which stores the GPB Actual value, and the GPB Estimate Register, which stores the GPB estimated value. The three flags are the UseActualGPB flag, the DelayUseActual flag, and the DontCountThisModule flag. The calculations of these values and how the flags are set, as well as the functions and rationales behind each of these registers and flags, are explained below.

GPB Actual Register

The GPB Actual Register is initialized with the value 0. Whenever a module is run, the time required to process that module is calculated. This is accomplished by implementing a continually running timer. The timer is assumed to be counting at a rate proportional to the basic instruction rate of the processor (i.e., the DSP Clock 111 in FIG. 1 supplies the clock for both the processor and the timer prescaler). Immediately prior to the DSP Kernel beginning to process a module, the timer value is read and saved. When the DSP Kernel completes processing the module, the timer value is, again, immediately read and saved. The difference between the first timer value and the second timer value determines the elapsed time required to process that first module. The elapsed time includes all system activities such as caching operations, I/O operations inherent in execution, set-up, the execution of the module, bus accesses, any clean-up process at the end (e.g. uncaching, saving back to memory, output operations, etc.) In other words, the elapsed time is the total time required to process that particular module. This actually measured process time is stored in the GPB Actual Register.

By adding together tile processing times for each module in the task list, the task list's processing time can be determined. FIG. 4 illustrates a typical programming structure wherein a task list 400 has tasks 401–403 ready for execution. Task list 400 is used to identify tasks waiting for execution. Task 401 is comprised of three modules 404–406. Task 402 is comprised of a single module 407. Lastly, task 403 is comprised of the two modules 408 and 409. Each module is comprised of sections (not shown).

The order of task execution is from top to bottom through the task list (e.g. 401, next 402, followed by 403). The order of module execution is from left to right. For example, with respect to task 401, module 404 would be executed first, followed by module 405, and finally module 406. The host application program specifies whether a task is active. If a task is not active, it is bypassed in the execution order. Similarly, the execution of a specific module may be bypassed by implementing a module skip mechanism.

Referring to FIG. 4, when the DSP Kernel starts execution of task 401, the timer value, $t_0$, is read and saved. At the end of module 404, the timer value, $t_2$ is read and saved. The difference in time between $t_2$ and $t_0$ is the elapsed time 410. Elapsed time 410 is the time required to process module 404, which also includes all system activities as described above. When the DSP Kernel stops executing module 405, the timer value is again read and saved. The elapsed time 411 (i.e. $t_4-t_2$) is the time required to process module 405. At the completion of module 406, the timer value is again read and saved, $t_6$. The elapsed time 412, between $t_6$ and $t_4$, is the time required to process module 406. The time required to process task 401 is the cumulative times 410, 411, and 412. This procedure can be repeated for tasks 402 and 403 to determine the total processing time for task list 400. Note that timer value $t_6$ is the $t_0$ value for task 402.

If a task is inactive, the timing method described above adds the processing time to skip over the inactive task into the GPB value of the next module that executes. For example, if task 402 was inactive, the value $t_6$ would end up becoming the $t_0$ for task 403. Thus, the time to execute module 408 would include the time to skip over the inactive task 402. To avoid this, the start value used for a task should be reloaded from the timer if the previous task is inactive, rather than using the final value from the last module of the previous active task. This process in effect does not count the inactive task skip time. However, when the task is active, the processing load will be substantially greater than when it is inactive. The "inactive skip" processing time can thus be assumed to be included as part of the active processing time.

Every time a module is processed, the above measuring procedure is performed on that module to determine the time required to process that module. The actual measured module processing time is compared to the value in the GPB Actual Register. The larger of these two values is stored in the GPB Actual Register. This results in a peak detection algorithm, wherein the maximum actual GPB used, including bus and I/O variations, is maintained in the GPB Actual Register. In other words, the GPB Actual value gives the worst case processing time that is being used by that module, up to that point in time.

FIG. 5 is a chart which illustrates the GPB Actual value for a sample module. The y-axis is the measured actual processing time used by a particular module. The x-axis represents real time. The GPB Actual Register is initially loaded with a value of 0. The module is processed a number of times, as indicated by the shaded rectangles. Each time the module is processed, the actual processing time is compared with the value in the GPB Actual Register. If the actual processing time is greater than the value in the GPB Actual Register, the actual processing time replaces the value in the GPB Actual Register. This results in a GPB Actual value 500. Note that the GPB Actual value 500 is updated after the latest value is computed and after the module completes execution of that frame.

GPB Estimate Register

Each module also has an associated GPB Estimate Register. The GPB Estimate Register is initially loaded with a GPB Estimate value by the DSP programmer or by automatic profiling tools. The GPB Estimate value is the estimated maximum level of processing time that could be used by that module. An estimated value is used because certain portions of the processing time depend on bus latency and other factors, such as different machines or implementations, or even for the same machines when users reconfigure them with optional add-in expansion cards. FIG. 6 is a chart which illustrates the GPB Estimate value 600 for a particular module. The GPB Estimate value can be determined experimentally, calculated by the DSP tools, or profiled in reference to a timer.

In the currently preferred embodiment, the processing times are measured as a function of instruction cycles. By using DSP instruction cycles as the unit of measurement, the execution time adjusts to the speed of the particular DSP being used. For example, with 10 millisecond frames, 166, 666 cycles are available at 60 nanosecond instruction cycles and 125,000 cycles are available for 80 nanosecond instruction cycles. Consequently, if a processor is operated at 60 nanosecond instruction cycles, instead of 80 nanosecond instruction cycles, more instruction cycles would be available for that particular frame. The processing speed is known by the DSP driver for that particular hardware implementation. When the DSP Kernel is computing the processing time available, it requests this information from the DSP Driver and is factored into the calculations. The values stored in the GPB Actual and GPB Estimate Registers are in reference to processor instruction cycles. Thus, when processing times are described, it is in reference to DSP instruction cycles.

Algorithm Categories

The GPB Actual and GPB Estimate Registers are used differently, depending on how the module's algorithm is categorized. Module algorithms are broken into three separate categories: smooth, smart-lumpy, and dumb-lumpy. A smooth algorithm is one that consistently takes approximately the same amount of time to execute per frame. The discrepancies in execution times for different frames are due to minor variations within the algorithm and also due to variations outside the control of the algorithm, such as I/O processing handled by the DSP Kernel and bus overhead, which varies depending on the amount of bus traffic. These discrepancies should be kept to within a few percent in order to qualify as a smooth algorithm. FIG. 7 illustrates a smooth algorithm. Some examples of smooth algorithms include algorithms for implementing Finite Input Response (FIR) and Infinite Input Response (IIR) filters, equalizers, echo processors, etc. Generally, a smooth algorithm does some fixed amount of processing with little or no decision making.

A lumpy algorithm is characterized by periods of heightened activity. A lumpy algorithm might use various amounts of processing time for each frame. The processing time varies depending on the data being processed, the status of the function the module is processing, and other variables. FIGS. 5 and 6 depict lumpy algorithms.

A smart-lumpy algorithm is an algorithm which has the ability to determine, programmatically, the instances when it is executing code that results in its using maximum processing time. An example of a smart-lumpy algorithm is a multi-rate modem. A multi-rate modem has various stages, such as initialization, setup, and data transfer. The maximum processing time is usually associated with the steady state data pump. In the preferred embodiment, when the maximum processing time situation occurs, the smart-lumpy algorithm initiates a call to the DSP Kernel, which then sets the UseActual GPB flag. The DSP Kernel does not actually set this flag until the GPB calculations for that module are completed. This aspect will be explained in greater detail below.

A dumb-lumpy algorithm is an algorithm which does not have the ability to determine, programmatically, the instances when it is executing code that will result in its using maximum (or beyond maximum) processing time. An example of a dumb-lumpy algorithm is analogous to a Huffman decoder. A Huffman decoder takes longer to decode certain types of bit streams than other types of bits streams. The processing time can even grow unbounded in the worst case scenario, where random noise is input. A separate mechanism is provided to manage this type of algorithm. In the preferred embodiment, this is handled by adding two DSP Kernel calls—one to find out how much processing time is alloted (via the GPB Estimate), and the other to determine how much has already been used. It is therefore up to the DSP programmer to ensure that the dumb-lumpy module does not exceed its allocated processing time.

How the GPB is Used

When a request is made to install a task in the real-time task list, the DSP Manager determines whether there is enough processing time available per frame at that time. When an application calls the DSP Manager to request the installation of a task, the current GPB available is calculated. The determination is made by comparing the estimated processing time for that task to the remaining processing time available in the frame. The remaining processing time is calculated by subtracting the GPB Actual or Estimate values for the modules corresponding to tasks already installed from the total processing time available for that frame. If there is enough processing time available, the new task will be installed. Otherwise, an error message will be sent back to the application or client attempting to do the installation and the task will not be installed. Optionally, the DSP Manager may request GPB from its existing clients first, and if any client returns GPB to the system, an error message may be unnecessary.

The determination of whether to use the GPB Actual value or the GPB Estimate value is described as follows. In the case of smooth algorithms, the UseActualGPB flag is set in the source code for the module. The initial state of the flag is indicated in the module data structure. Since the UseActualGPB flag is set, the GPB Actual value is used as the correct current processing time for the module. However, if the GPB Actual value is zero, the GPB Estimate value is used instead in the calculations. In other words, the GPB Estimate value is used until the module has a chance to run at least once. After that, the GPB Actual value is used, irrespective of whether it is smaller or larger than the GPB Estimate value. In the currently preferred embodiment, the GPB Actual value is updated (peak algorithm) for a module each time that particular module is executed. In this manner, the GPB system adapts to different CPU configurations and realtime variations, such as bus loading.

In the case of smart-lumpy algorithms, the UseActualGPB flag is not initially set because the GPB Actual value is meaningless until the maximum processing time situation is reached. Since the UseActualGPB flag is not yet set, the GPB Estimate value is used as the correct current processing time for this module. However, if the GPB Actual value is larger than the GPB Estimate, the larger value is used. This condition occurs whenever a module has not quite reached its worst case but already has exceeded the estimate. When a smart-lumpy algorithm determines that it has reached the maximum processing time situation, it makes a call to the DSP Kernel to set the DelayUseActualGPB flag.

The reason why a DelayUseActualGPB flag is required is because if the DSP Manager happens to interrogate the GPB values between the time the Kernel call is made by the DSP module and when the latest GPB Actual is calculated at the exit from the module, it will retrieve an erroneous GPB Actual value. This is due to the fact that, at that instant in time, the GPB Actual Register still contains the previously stored actual value. The actual value for the current scenario has not yet been updated.

Hence, a DelayUseActual flag is required. FIG. 8 illustrates how the UseActualGPB flag 800 and the DelayUseActual flag 801 are used and set in reference to the processing of a smart-lumpy module. Some length of time after frame start boundary 803, the processing of a smart-lumpy module begins at time 804. Processing continues until time 805. The DSP module calls the DSP Kernel to set the UseActualGPB flag 800 at time 806. The call causes the DelayUseActual flag 801 to be set. Note that the UseActualGPB flag 800 is kept in the off state (not set). A short time after the module has been processed, the GPB Actual value is determined and stored in the GPB Actual Register at time 807. The DSP Kernel then checks the DelayUseActual flag 801 at a later time 808. If that flag is set, then the UseActualGPB flag 800 is set and the DelayUseActual flag 801 is reset to the off state (not set). Thus, if the DSP Manager happens to interrogate the GPB value in the middle, while the module is being processed, the GPB Estimate value will be used rather than an erroneous GPB Actual value (unless the GPB Actual is already larger than the GPB Estimate). Once the GPB Actual Register has been properly updated, the GPB Actual value will then be used. This updated GPB Actual value is used thereafter, and the value is additionally updated if required by the previously described peak algorithm.

An alternate method for handling the flag setting is to require the DSP programmer to set the UseActual flag the next frame after the maximum processing has occured, via the Kernel call. This is functionally correct, but adds programming burden to the DSP programmer, and increases the potential for error.

As briefly described earlier, in the case of dumb-lumpy algorithms, the algorithm makes two calls to the DSP Kernel. One call fetches the expected processing time for that module, which is stored in the GPB Estimate Register. The other call fetches the amount of processing time which has been used up to that instant. The algorithm compares these two values. If the algorithm is close to exhausting its allotted time, the module should execute its processing termination procedure (e.g., aborts for this frame). This procedure should end the processing in a manner appropriate for that particular module. By repeatedly making the second of these two calls, the algorithm is provided with information to determine when it should terminate its execution. Thus, a dumb-lumpy is required to manage its alloted processing time itself.

If a dumb-lumpy overruns its allotted time, the GPB Actual will exceed the GPB Estimate. This is actually a fairly likely situation, in that the programmer can only make an educated guess at how much time is required to complete the context switch when exiting his module. As previously described, this larger value will be used when computing available GPB when another client wishes to install an additional task. This guarantees that the additional context switch time is included in future GPB availability calculations.

Thus, the calculation of remaining processing time proceeds by adding up all of the current processing requirements of each installed module as described, and subtracting the total processing from the available frame processing. Note that this calculation includes both active and inactive tasks. This is necessary so that the required processing time for inactive tasks is reserved for when they are activated.

Once a task and its related modules have been used for the desired purpose and the application prepares to quit, the task is unloaded from the task list, automatically returning its GPB to the system for use by other modules. At this time, smooth and smart-lumpy algorithms have a more accurate GPB value stored in their GPB Actual register. This value reflects the real execution time for the current environment. The application can choose to update the module on disk with this new actual value by storing it in the GPB Estimate, effectively updating the estimate. This operation is performed by the DSP Manager on request from the client. Alternatively, the DSP Manager may automatically do this for the client. However, there are drawbacks in this approach, such as dealing with locked disk files; updating applications with DSP resources in them which alters their "modification" dates; or multiple users updating a shared DSP resource on a file server.

In the preferred embodiment, a "preferences" file is maintained by the DSP Manager on that particular systems boot disk. Whenever a task is unloaded, any improved GPB values in the modules within the task are written to the preferences file. Whenever a module is loaded, the preference file is checked to see if more accurate information is available, which is used instead. This eliminates the problems associated with file servers and modification dates for applications.

Note that the availability of an updated GPB Estimate in the preferences file indicates that the module has been used previously in this particular computer system. This also indicates that the GPB Estimate has been adjusted to reflect the performance of this computer system, and is therefore significantly more accurate than the GPB Estimate in the module file. This distinction can be utilized to reduce frame overruns. In particular, the DSP Manager can add some percentage to the GPB Estimate for a module if nothing is found in the preferences file when comparing the estimate and the available processing time. This extra margin can reduce the likelihood of the estimate being too low for this machine. Alternatively, this extra margin can be added only if the remaining processing available is close to the required processing as indicated by the estimate.

It is this update mechanism that provides the last step to close the loop in the system, to make it truly an adaptive system. Note that this process only has meaning for smooth and smart lumpy modules. Dumb lumpy modules are required to limit their processing to the estimated value themselves.

Grouped Modules

The currently preferred embodiment of the present invention utilizes a component architecture approach, wherein generic modules for performing generic functions can be intercoupled to provide different functionalities. An example of this building block approach is that of a telephone answering machine, as shown in FIG. 9. The Telephone Answering task 901 can be implemented by grouping together standard modules 902–904. Status module 902 provides the status and controls functions such as detecting rings, taking the phone line off-hook, hanging up the phone, etc. Next, Sub-Band Decoder module 903 is used to provide a player function for playing a greeting to the caller and for playing back any recorded messages. The Sub-band Encoder module 904 is used to provide a recorder function.

The Telephone Answering task 901 does not actually uses all of its modules 902–904 simultaneously. For example, when a message is being played, the recorder function is idle and vice versa. Thus, calculating the GPB values for this task by adding up the processing times for each module would result in an over-estimation because not all modules will be executed in the same frame. This would effectively lock out real time processing bandwidth from other tasks, which would never actually be used. For example, if the GPB values for Status module 902 were 1,000 cycles; Sub-band Decoder module 903 were 5,000 cycles; and Sub-band Encoder module 904 were 6,000 cycles; this results in a total GPB value of 12,000 cycles. The worst-case situation is actually 7,000 cycles (Status module 902 plus Sub-band Encoder module 904). Thus, Telephone Answering task 901 does not need an allocation of 12,000 cycles. Rather 7,000 cycles is all that is required.

In order to make more efficient allocation of processing time in this type of situation, the currently preferred embodiment of the present invention utilizes a DontCountThisModule flag. When a request is made to determine the processing time for a particular task, the DSP Manager checks each of the task's modules to determine whether this flag is set. If the DontCountThisModule flag is set for a module, the GPB value of that particular module is not included in the total GPB value for that task. It is the responsibility of the client installing the task to determine the worst case utilization of the modules and to set the DontCountThisModule flags for the relevant modules. Hence, in the example given above, the DontCountThisModule flag is set for the Sub-band Decoder module 903.

Note that if the programmer incorrectly uses the DontCountThisModule flag, the GPB used by the task list will be incorrectly calculated too low, allowing the installation of additional tasks when none may be in fact desireable. In this case, a frame overrun may result. One way of correcting this problem is to maintain a GPB Actual register in the task structure for a task-level check on the processing load. This additional measurement allows better error correction and recovery if this mistake was made by a programmer.

Scaling Vectors

Another aspect of the present invention which enhances modularized DSP functions in various configurations is the use of scaling vectors. Scaling vectors enable one module to function in multiple instantiations. In other words, scaling vectors enable generic modules to adapt to various buffer sizes, sample rates, and frame rates. Various GPB values are also implemented to correspond to the various instantiations. For example, a module which has a GPB value of 5,000 cycles at a frame rate of 100 frames per second may require only 2,700 cycles at 200 frames per second. Instead of having to create a set of functionally identical modules for each possible case, a single module can be implemented with scaling vectors that allows it to be used in all of the desired cases.

When a module is first programmed, the programmer determines the different ways that the module can conceivably be used and also determines the respective GPB values for each different implementation. The programmer then enumerates the possibilities as a list of scaling vectors. The list is stored with the module. When an application attempts to use the module a certain way, the loader determines, from the module's scaling vector list whether that module can be used for that instantiation. The loader also selects the GPB value for that instantiation.

A scaling vector is comprised of three values: a frame rate, a scale factor, and a GPB value. The scale factor is used to determine the size of scalable I/O buffers for a particular module. Table 1 below illustrates some possible applications for a 2-to-1 sample rate converter.

TABLE 1

| 100 frames/sec | 24 kHz to 12 kHz |
| 200 frames/sec | 24 kHz to 12 kHz |
| 100 frames/sec | 8 kHz to 4 kHz |
| 200 frames/sec | 8 kHz to 4 kHz |
| 100 frames/sec | 16 kHz to 8 kHz |
| 200 frames/sec | 16 kHz to 8 kHz |
| 100 frames/sec | 48 kHz to 24 kHz |
| 200 frames/sec | 48 kHz to 24 kHz |
| 100 frames/sec | 32 kHz to 16 kHz |
| 200 frames/sec | 32 kHz to 16 kHz |

Since this module is a 2-to-1 converter, the size of the scalable input buffer in the source code should be set to 2, and the scalable output buffer should be set to 1. Table 2, shown below, gives the ten corresponding scaling vectors.

TABLE 2

| 100, 120, 5000 | 100 f/s, scale = 120 for I/O size of 240/120, GPB = 5000 |
| 200, 60, 2500 | 200 f/s, scale = 60 for I/O size of 120/60, GPB = 2500 |
| 100, 40, 1666 | 100 f/s, scale = 40 for I/O size of 80/40, GPB = 1666 |
| 200, 20, 833 | 100 f/s, scale = 20 for I/O size 40/20, GPB = 833 |
| 100, 80, 3333 | 100 f/s, scale = 80 for I/O size of 160/80, GPB = 3333 |
| 200, 40, 1666 | 200 f/s, scale = 40 for I/O size of 80/40, GPB = 1666 |
| 100, 240, 10000 | 100 f/s, scale = 240 for I/O size of 480/240, GPB = 10000 |
| 200, 120, 5000 | 200 f/s, scale = 120 for I/O size of 240/120, GPB = 5000 |
| 100, 160, 6666 | 100 f/s, scale = 160 for I/O size of 320/160, GPB = 6666 |
| 200, 80, 3333 | 200 f/s, scale = 80 for I/O size of 160/80, GPB = 3333 |

When an application requests that a module be loaded, a call is made to the DSP Manager. One of the parameters provided to the DSP Manager in the call is the scale factor. The DSP's current frame rate is provided automatically. If there is a matching scaling vector, the module's scalable I/O Buffers are scaled appropriately, and the corresponding GPB value is used. Note that a scalable buffer flag is included in the buffer flags to indicate if scaling is to be performed. For example, if the 200,80,333 vector is chosen from Table 1, then the I/O buffer sizes would be multiplied by 80, the scale factor. This would make the input buffer (initially size 2) big enough for 160 samples, and the output buffer (initially size 1) big enough for 80 samples—perfect for a 2/1 sample rate convertor running at 200 frames per second and processing 32 KHz data.

If there is no matching scaling vector, an error is returned. Note that the module algorithm requires knowledge of the buffer size at run time to determine how much processing is required. A DSP Kernel call or macro must be provided to provide buffer size information to the module on request.

Table 2 indicates a simple, linear relationship between buffer size (scale factor) and GPB. If this were really the case, only a single value would be needed—the GPB per unit of scale factor. In reality, the GPB value consists of a certain amount related to loading and handling of the module and its buffers and a processing load that is often, but not always, a linear relationship to the I/O buffer size or scale factor. Since the GPB values are related to the scale factor in a more complex way, each of the GPB values in the scaling vectors should be initially estimated as shown in Table 2, and then more accurately measured in an actual system with some form of profiler tool.

The GPB Estimate update technique described earlier (i.e. the preference file) can also be supported with scaling vectors. This is accomplished by the DSP Manager keeping track of which scaling vector was being used, and updating only the related GPB Estimate.

In an additional embodiment, for applications which do not know the details of a module but which, nevertheless, wish to use it as a generic building block, a DSP Manager call is provided to retrieve information concerning the module. The call can be used to select the desired scale factor. The call returns the available input and output buffer sizes at the current frame rate, and the scale factors. This list is limited to scalable I/O buffers specified by the module programmer. The application must make a selection based on the required I/O buffer sizes. The associated scale factor is then passed to the loader.

Dynamic Processing Time

The execution of certain programs could take all or a great majority of a frame's processing time under certain circumstances. Under other circumstances, these same programs could take substantially less processing time to execute. The currently preferred embodiment of the present invention dynamically varies the processing time for a particular module, depending upon the availability of the processing time.

The present invention accomplishes this through the use of the scaling vectors. When a module is written, the programmer can generate, not just one, but a number of various GPB values for a given frame rate and scale factor. The different GPB values for the same frame rate and scale factor represent different levels or modes by which that particular module could be executed. Thus, when a module desires more processing time, the application can make a call to the DSP Manager to determine whether additional time is available. If additional processing time is available, a specific scaling vector having a larger GPB value can then be selected and used by that module. Alternatively, the scaling vector having the largest GPB value which could be loaded (i.e., fits into the available processing time) is selected and used by that module.

A similar process is used to give up unneeded processing time. Note that the application is responsible for informing the module via Shared Memory when the GPB level is changed. Likewise, the module can request a change of processing by setting values in Shared Memory for the client to read (polling mode) or send a message to the client (interrupt mode). Thereby, a particular module can have different execution levels, depending on the availability of processing time.

In the preferred embodiment, a mechanism is established between the module, the client, and the DSP Manager to effect these GPB "mode" changes. This mechanism is comprised of a single 32-bit word in shared memory. The upper 16-bits is read/write for the host, and contains the desired mode number. The lower 16-bits is read/write for the DSP, and contains the current actual mode number. Both processors may read the entire 32-bit word.

At any given time, the desired mode can be set by the host, assuming the proper GPB calculations have been preformed. The DSP Manager can then query the actual mode, and handle the mode change when the DSP module finally makes the mode switch. Note that the mode change can be instigated by either the DSP module (via a message to the client) or by the client. In either case, it is the client that actually makes the DSP Manager calls to effect the change. It is then the responsibility of the DSP module to activate the new mode when it reads the mode change in shared memory, and to indicate when the mode change is complete by storing the new mode number in the shared memory.

The mode change is accomplished by the client making a call to the DSP Manager, specifying the desired mode number. The DSP Manager fetches the GPB value for this mode from the scaling vector, and determines if it is an increase in GPB or a decrease. If a decrease is indicated, the new mode number is set in the shared memory, and a deferred task is set up to query the shared memory to detect when the module has changed modes. The GPB Estimate is changed to reflect the new, lower value. The GPB Actual is left as is for the moment. Control is then returned to the client. Under the control of the deferred task, the shared memory is checked until the module makes the mode change. When this takes place, the GPB Actual is saved for use in updating the preference file later, and is set to zero. This allows the new, lower GPB Actual value to be computed, using the standard peak algorithm described previously.

If a GPB increase is determined from the requested mode change, than an internal DSP Manager call is made to determine whether enough GPB is available to handle the increase request. If there is sufficient GPB, the required GPB is taken, and the GPB Estimate is revised upward, using the value in the new mode's scaling vector. The GPB Actual is saved for updating the preference file at a later time. Control is then returned to the client. If there is not enough GPB available, the DSP Manager can request GPB from all current clients. If a client gives up some of its GPB, and the result is that sufficient GPB is now available, the process completes as described. However, if there is no way to get the needed GPB, then an error is returned to the client. The current mode is therefore not changed.

Note that the format of the scaling vectors to handle multiple modes is a simple extension of the basic scaling vectors. The vectors can be arranged in any order, which allows grouping by mode, by frame rate, or by sample rate, depending on the programmer's desire. There are alternate methods for encoding the modes, which have some value, but require additional intelligence in the tools. For example, the scaling vector could be variable size, and contain the frame rate, the scale factor, and a GPB mode count, followed by that number of GPB values for the different modes. This could make it easier for programmers to keep track of modes. Alternatively, scaling vectors could have four values: a mode number could be included with each vector. This could potentially prevent some programmer errors.

The following example of a modem module illustrates how its processing time can be dynamically varied, depending on the availability of processing time. Presently, modems can operate over a wide range of different speeds—for example, 1200 baud with V.22 to 9600 baud with V.32. Furthermore, various other modem speeds also exist and may be developed in the future. Generally, the faster the operating speed, the more processing time is required. In other words, the modem module requires more processing time to handle a V.32 call versus a V.22 call. Hence, the modem module can have various GPB values, depending on the desired operating speed. The different GPB values are reflected in the scaling vectors for the modem module. Table 3 shows five different GPB values which correspond to five different operating speeds, given a frame rate of 100 frames/second and a scale factor of 20.

TABLE 3

| Operating Speed | Frame Rate | Scale Factor | GPB Value |
|---|---|---|---|
| V.22 | 100 | 20 | 4000 |
| V.22 bis | 100 | 20 | 4500 |
| V.29 fax | 100 | 20 | 7000 |
| V.32 | 100 | 20 | 9000 |
| V.32 bis | 100 | 20 | 9500 |

Supposing that the modem module is initially set up with a minimum requirement to operate on V.22 (GPB of 4000 cycles). When the phone rings, the modem module requests additional processing time in case the incoming call is V.32 bis (GPB of 9500 cycles). It does this by sending a message to the modem client. The client requests the mode change by calling the DSP Manager. The DSP Manager looks up the new mode's vector, and determines that an additional 5500 GPB cycles are required to switch to that mode. It then determines whether the extra 5500 cycles are available. If the additional processing time is available, the modem module is notified via shared memory and implements the scaling vector corresponding to V.32 bis: 100,20,9500. The DSP Manager takes care of the GPB Estimates and GPB Actual values, as described earlier.

The modem module now has a GPB value of 9500 rather than 4000. The phone is answered. If the incoming call happens to be V.32 bis, the modem module has enough processing time to handle the call. However, if the incoming call happens to be V.22 bis, the modem module falls back to a GPB value of 4500 by implementing the V.22 bis scaling vector: 100, 20, 4500. This is done by sending a message to the modem client, which then requests the GPB change from the DSP Manager. After the incoming call has been completed, the modem module relinquishes the extra processing time using the same mechanism by reverting to the V.22 scaling vector 100, 20, 4000.

Note that in this example, if insufficient GPB is available to shift above V.22, the modem answers the phone as a V.22 modem, forcing any higher speed calling modem to fall back to V.22. This process allows dynamic allocation of DSP resources, depending on the load at any given time from user demands.

An alternative embodiment is to implement scaling vectors for calculating a more accurate initial GPB Estimate value for a module. This results in a more accurate initial GPB Estimate value. First, the Host Driver provides the hardware implementation data on transfer times (measured in nanoseconds) required for different types of memory references. The access time is the average real-time duration from the time a data request is made to the time the data is actually received and the transaction is terminated. Bus and memory performance is accounted for in the transfer time. Next, the number of memory accesses for each type of memory reference for the module is determined. This can be determined by one of three different methods. One method is for the programmer to compute these numbers.

In an second method, the development hardware can actually count the number of times that each type of memory reference is accessed by the module for a frame. In yet a third method, the time to perform one particular type of memory reference can be slowed. The total time required to process the entire module with one type of memory reference slowed is measured. The regular time (not slowed) for processing the entire module is subtracted. The resulting time differential is then divided by the difference between the access time for one slowed access and one regular access for that particular type of memory reference. The result yields the number of accesses for that particular type of memory reference for that module. This method is repeated for each different type of memory reference.

Once the numbers are known, the total time for each type of memory reference for the module can be calculated by multiplying the number of memory transfers of that particular type by the time required to perform that particular type of memory transfer. Afterwards, the estimated processing time for the entire module is determined by adding together the times for each type of memory reference. This estimated processing time is then converted into a GPB value by dividing it with a real-time/GPB ratio.

Table 4 below illustrates an example of deriving a GPB Estimate value based on this type of scaling vector.

TABLE 4

| Memory Access Count ($N_i$) | Type of Memory Reference | Access Time (ns) |
| --- | --- | --- |
| $N_1 = 10,000$ | Cache Memory | 72 |
| $N_2 = 205$ | Local Memory - Single | 200 |
| $N_3 = 117$ | Local Memory - Page or Block Transfer | 150 |
| $N_4 = 82$ | System Memory - Single | 1200 |
| $N_5 = 41$ | System Memory - Page or Block Transfer | 1000 |

Given a computer system having five different types of memory references, the average access time for each type of memory reference is determined. Note that other types of computer systems can include additional types of memory references. For a particular module, the number of times that module performs that type of memory reference is calculated (memory access count $N_{1-5}$). The scaling vector now comprises seven numbers: the frame rate, the scaling factor, and $N_{1-5}$. The total time for processing the module can be calculated based on the scaling vector as follows: (10,000 * 72)+(205 * 200)+(117 * 150)+(82 * 1200)+(41 * 1000)= 917,950. Given a real-time/GPB ratio of 72, the GPB Estimate value for this particular module is 12,749. Note that the ratio used is the counting rate of the timer, and usually equals the time of $N_1$ counts.

One negative aspect of this alternative embodiment is that even though the GPB Estimate value is initially more accurate, it cannot subsequently be updated based on GPB Actual values. In other words, there is no feedback mechanism to close the loop. Thus, this alternative provides a more accurate initial estimate but cannot adapt to additional changes introduced into the system by the user, such as expansion cards, etc. The preferred embodiment ultimately results in a more accurate estimate.

Another alternative embodiment involves calculating the GPB value for a particular module based on the following equation: GPB=mx+b, where "m" corresponds to the incremental amount of time for each additional sample to be processed, "x" is the number of samples, and "b" corresponds to the overhead time such as caching, context switching, and program set up times. For a more accurate GPB value, this alternative embodiment can also incorporate the scaling vector concept described in the previous alternative embodiment. That is, different "m" and "b" values are used corresponding to the different types of memory references. Since the scaling vector contains the number of accesses for each type of memory reference, the total GPB value for the module is the sum of the GPB values for each type of memory reference (as calculated according to the formula given above: GPB=mx+b). However, this alternative embodiment is limited to modules having a relatively linear processing load with respect to the number of samples which are processed.

Timeshare

In addition to processing tasks in real-time, the currently preferred embodiment of the present invention processes tasks on a timeshare basis. Real-time tasks are those tasks which are executed at regular intervals (i.e. each frame). In contrast, timeshare tasks need not be executed every frame. Some examples of tasks which can be processed on a timeshare basis include compression of disk files, graphics, animation, video decompression, etc.

Timeshare tasks are processed at the end of frames which have processing time left over, after all of its real-time tasks have already been processed. The amount of processing time available for timeshare in a particular frame depends on how many real-time tasks are being processed and their respective processing times. If the realtime tasks consume all the processing time of a frame, no timeshare tasks can be processed in that frame. On the other hand, if no real-time tasks or minimal real-time tasks are being processed during a particular frame, there would be a great deal of processing time for timeshare tasks during that frame.

Before a task is to be processed on a timeshare basis, it should first be determined whether that task can properly be serviced on a timeshare basis, due to the fact that the total timeshare available varies from frame to frame. The DSP Kernel knows how much processing time is available per frame, since it is computing the GPB Actuals for all of the realtime tasks. The average total remaining (unused) real-time available for use by timeshare may be computed as follows: for each frame, recompute the average time remaining after all real-time tasks have completed. A form of moving average calculation is utilized, such as:

Average timeshare=previous average value * 0.9+current frame value * 0.1.

This gives each new frame's remaining time a 10% weight, against a weight of 90% on the previous average. Alternate averaging techniques can be used. Also, it is possible for the DSP Manager to do this calculation by sampling the value every n frames. While this may not be as accurate, it simplifies the Kernel.

Since there may be a substantial context switching overhead when switching between realtime and timeshare and vise versa, this amount should be subtracted out to give a more accurate value of real processing available. This value should be provided by the Host Driver to the DSP Manager. Note that the context switch overhead is the minimum amount of time that must be available before any timeshare tasks can be installed. Normally, if no timeshare tasks are installed, all of the available frame time can be allocated by realtime tasks. If there is still the minimum time available, a timeshare task may be installed, otherwise an error will be returned. Once there are tasks in timeshare, the realtime allocation can never exceed the total time minus the minimum required context switch time. In effect, installing the first timeshare task allocates some of the processing bandwidth for timeshare context switch. If all timeshare tasks are removed, this time can be allocated to realtime tasks.

In addition to the average available timeshare processing, the frequency of the timeshare task list execution is required. If there are many tasks in the timeshare task list, execution frequency for each task will be low. A measure of this can be computed by calculating a moving average of the number of frames required to completely process the timeshare list once. This must be done each time through the timeshare task list. The calculation could be done as follows:

frames used=ending frame number—starting frame number

Average frames used=previous average frames used * 0.9+current frames used* 0.1

Note that it is possible to have a "frames used" value of zero for cases where few timeshare tasks are active or installed, or where most of the processing time is available for timeshare. This will result in an average frames used value of less than 1.0. Other averaging methods may be used. The average frames used value could alternately be computed by the DSP Manager by sampling the realtime and timeshare frame numbers on a regular basis. This will be less accurate, but reduces the Kernel complexity.

By using the average frames used and the average available timeshare processing per frame, the frequency in which a new timeshare task will be executed can be computed as follows:

current timeshare load=Average timeshare * Average frames used proposed timeshare load=current timeshare load+GPB Estimate of task computed frames used=proposed timeshare load/Average timeshare If the calculated "proposed" frames used is too high (infrequent) for the desired function, the task should not be installed in the timeshare list. Note that a timeshare client must monitor the processing rate of its timeshare tasks because change in the real-time load or in the timeshare task list affects the amount of processing its timeshare task receives. This process can be assisted by notifying a timeshare client whenever a new real-time task is added to the task list. Another technique for monitoring timeshare processing rate is for the client to request the timeshare frame number from the DSP Manager. The number is incremented once for each pass through the timeshare task list. Another aid to timeshare management is to provide the unallocated GPB value per frame in addition to the average timeshare value described above. Since GPB can be allocated and not used, the unallocated GPB is typically smaller than the typical average actually available GPB. This number is used to give a "worst case" computed frame rate as follows:

current timeshare load=Average timeshare * Average timeshare frames used proposed timeshare load=current timeshare load+GPB Estimate of task computed worst case frames used=proposed timeshare load/unallocated GPB The computation gives the frames used for timeshare execution, assuming all real-time tasks are using their allotted GPB.

When timeshare tasks are executing, it is necessary to pre-empt execution for real-time tasks which must be processed "on-time." This is accomplished in the currently preferred embodiment by interrupting timeshare execution to run real-time. In such a case, the context of the timeshare task is saved and then restored after real-time has completed.

If the context save and restore process takes a significant time to complete (e.g., saving the cache and reloading the cache in a cache-based processing system), this time should be taken into consideration when allocating real-time. This is the same overhead subtracted out from available timeshare processing, as described earlier. In particular, when the real-time task list completes, a check is made of the timer to determine whether them is enough time to restore and save the timeshare process before the end of the frame. If there is not enough time, timeshare processing is not restored for this frame. Thus, in a heavily loaded system, timeshare execution can drop to zero.

An example of an alternative technique for managing timeshare is to run timeshare modules only if the remaining processing time available in a given frame exceeds the required processing for the module (GPB Estimate and/or GPB Actual). In such a case, the timeshare module should complete execution prior to the end of the frame. Thus, no timeshare module should "straddle" a frame boundary. If this is done, the GPB Actual value is significant as in realtime. This technique eliminates context save/restore overhead but requires more processing for the executive function in the DSP Kernel. Also, error recovery capability must be provided, in case a timeshare module fails to complete execution prior to the frame boundary. Note that this technique requires that all modules run within a frame, which could make programming more difficult for long tasks (i.e., the programmer manually breaks up execution in chunks, rather than relying on the context switch process doing it automatically).

Thus, in a computer system having a digital signal processor for processing real-time tasks in a frame based system, an apparatus and method for ensuring that the task is executable within the frame such that the frame's total processing time is not exceeded if the task is processed within that frame, is disclosed.

What is claimed is:

1. In a computer system having a processor for processing data in real-time by executing at least one task during each of a series of predetermined duration processing frames, a computer implemented method for determining whether a first task is executable within a particular predetermined duration processing frame such that a total processing duration corresponding to said particular predetermined duration processing frame is not exceeded if said task is processed within said particular predetermined duration processing frame, comprising the steps of:

determining a required processing duration for said first task;

calculating a required processing duration for a set of tasks in a task list, said set of tasks including at least one second task designated for execution during said particular predetermined duration processing frame, said at least one second task included in said task list for said particular predetermined duration processing frame, said task list specifying at least said second task to be executed in said particular predetermined duration processing frame;

calculating an amount of processing time available in said particular predetermined duration processing frame by subtracting said required processing duration for said set of tasks from said total processing duration; and installing said first task in said task list if said amount of processing time available is at least as great as said required processing duration for said first task, otherwise generating a signal indicating said first task cannot be installed.

2. The method of claim 1 wherein said required processing duration for said set of tasks is determined by adding together processing durations for each installed task in said task list.

3. The method of claim 2 wherein each task is comprised of at least one module having a module's processing duration.

4. The method of claim 3 wherein said processing duration for an installed task is calculated by determining a worst-case utilization of said modules corresponding to said task and adding together each module's processing duration for said worst-case utilization.

5. The method as in claim 3 further comprising the step of implementing one or more scaling vectors corresponding to said module for calculating said module's processing duration, said scaling vectors including a frame rate, a scaling factor, and at least one memory access count(s) corresponding to at least one type of memory reference.

6. The method of claim 3 further comprising the step of implementing one or more scaling vectors corresponding to said module for calculating said processing duration for said module, wherein said module's processing duration for said module is determined according to the formula mx+b, wherein m correspondence to an incremental amount of time for processing an input sample, b corresponds to an overhead time for said computer system, and x corresponds to a number of samples to process, wherein said scaling vectors include a frame rate, a scaling factor, and said values of m and b.

7. The method of claim 3 wherein said module's processing duration is calculated in reference to said module's type of algorithm, wherein:

if said module comprises a smooth algorithm, said module's processing duration is an estimated processing duration if an actual processing duration has not been measured for said module, otherwise said module's processing duration is comprised of the actual processing duration;

if said module comprises a smart-lumpy algorithm, said module's processing duration is comprised of the larger of said estimated processing duration and actual processing duration if said task's worst-case processing duration situation has not yet occurred, otherwise said module's processing duration is said actual processing duration;

if said module comprises a dumb-lumpy algorithm, said module's processing duration is the larger of said estimated processing duration or actual processing duration for said module.

8. The method as in claim 7 wherein a processing allocation of said module is varied dynamically, depending on said availability of processing time within said particular predetermined duration processing frame.

9. The method of claim 8 further comprising the step of updating said actual processing duration when said task is removed from said task list and storing said updated processing duration in a storage means.

10. The method of claim 9, wherein said updated processing duration is retrieved and utilized in calculating said required processing duration for said set of tasks.

11. The method of claim 7 wherein said actual processing duration for said module is measured by a timer.

12. The method of claim 11 wherein said module's actual processing duration measured by said timer includes related system activities.

13. The method of claim 12 wherein said module's processing duration measured by said timer is measured in reference to instruction cycles of said processor.

14. The method of claim 13 wherein if said module is processed in a subsequent predetermined duration processing frame which follows a prior predetermined duration processing frame, a comparison is made between a prior actual processing duration for said prior predetermined duration processing frame and a subsequent actual processing duration for said module during said subsequent predetermined duration processing frame, said actual processing duration for said module is updated with the larger of these two values.

15. The method as in claim 12 wherein a plurality of scaling vectors corresponding to said module are implemented, enabling said module to function in different instantiations.

16. The method of claim 15 wherein said scaling vectors include a frame rate, scale factor, and a processing bandwidth value.

17. In a computer system wherein data is processed in real-time by executing at least one task during each of a series of predetermined duration processing frames, an apparatus for ensuring that a first task can be completely executed within a particular predetermined duration processing frame such that a total processing duration for said particular predetermined duration processing frame is not exceeded, comprising;
- a task list for specifying a set of tasks to be processed during said particular predetermined duration processing frame, said task list being stored in said computer system;
- a digital signal processor coupled to said computer system for executing said task list; and
- an operating system coupled to said computer system which determines an available processing duration for said particular predetermined duration processing frame by subtracting an execution duration for executing said set of tasks from said total processing duration for said particular predetermined duration processing frame, wherein if said available processing duration is at least as large as an execution duration for said first task, said first task is included in said task list, otherwise said first task is not included in said task list.

18. The apparatus of claim 17 further comprising a scaling vector for calculating said execution duration for said first task, said scaling vector including a frame rate, a scale factor, and at least one memory access count corresponding to at least one type of memory reference and wherein said scaling vector being stored in said computer system.

19. The apparatus of claim 17 further comprising a scaling vector for calculating said execution duration for said first task, said scaling vector including a frame rate, a scale factor, and values m and b, wherein said execution duration for said first task is determined according to the formula mx+b, wherein m correspondence to an incremental amount of time for processing an input sample, b corresponds to an overhead time for said computer system, and x corresponds to a number of samples to process and wherein said scaling vector being stored in said computer system.

20. The apparatus as in claim 17 further comprising a first flag corresponding to each task in said task list, wherein the state of said first flag determines whether said corresponding task is active, wherein active tasks in said task list are processed during said particular predetermined duration processing frame when said task list is executed.

21. The apparatus as in claim 20 wherein said execution duration for executing said set of tasks is determined by adding together all processing durations for each task which is installed in said task list.

22. The apparatus of claim 21 wherein each task is further comprised of at least one module.

23. The apparatus of claim 22 further comprises a second flag associated with said module which has a module's processing duration, the state of said second flag determining whether said module's processing duration is to be included in calculating said task's processing duration, wherein said task's processing duration is the sum of the total processing times for each module of said task as determined by said second flag.

24. The apparatus of claim 23 further comprising:
- a first register associated with said module for storing said module's actually measured processing duration;
- a second register associated with said module for storing an estimated processing duration for said module;
- a third flag which determines whether said first register value represents the worst case of said module's processing duration, wherein the state of said first, second and third flags depends upon said module's algorithm.

25. The apparatus of claim 24 wherein said module's algorithm includes one of three types: smooth, smart-lumpy, and dumpy-lumpy.

26. The apparatus of claim 25 further comprising a timer for determining said module's actual processing duration including any related system activities.

27. The apparatus of claim 26 wherein said timer determines said module's actual processing duration in reference of an instruction cycle.

28. The apparatus of claim 27 wherein each time said module is processed, said timer measures an actual processing duration for said module, said first register is updated with said actual processing duration if said actual processing duration is larger than said first register's current value, otherwise said first register is not updated.

29. The apparatus of claim 28 further comprising a plurality of scaling vectors associated with said module, enabling said module to perform its function in a plurality of instantiations.

30. The apparatus of claim 29 wherein said scaling vectors include a frame rate, a scale factor, and a processing value.

31. The apparatus of claim 30, wherein said estimated processing duration of said module is derived from said scaling vector.

32. The apparatus of claim 30 wherein said module's processing allocation is varied dynamically, depending on said availability of processing time within said frame.

33. The apparatus of claim 32 further comprising a storage means for storing updated processing durations.

34. The apparatus of claim 33 further comprises a means for calculating said execution duration for executing said set of tasks based on said updated processing durations in said storage means.

35. In a computer system having a processor for processing data by executing at least one task during each of a series of predetermined duration processing frames, a computer implemented method for determining whether a first task can properly be serviced on a timeshare basis during said series of predetermined duration processing frames, comprising the steps of:
- determining a required processing duration for said task, said first task comprising at least one module having a module's processing duration, said required processing duration for said first task being calculated by determining a worst-case utilization of said at least one module and adding together each module's processing duration corresponding to said worst-case utilization;
- determining an amount of processing duration which is available for timeshare processing per predetermined duration processing frame;
- computing a frequency of execution for timeshare processing of said first task during said series of predetermined duration processing frames; and
- comparing said frequency of execution with a required timeshare execution frequency for said task.

36. A method as in claim 35 further comprising:
- installing said first task in a list of timeshare tasks if said frequency of execution is at least as large as said required timeshare execution frequency for said first task.

* * * * *